July 30, 1968  G. TERRIER  3,395,371
MOTOR OPERATED CONTROL DEVICE FOR ELECTRIC
SWITCHES COMPRISING A ROCKING CONTROL
Filed Nov. 22, 1966  4 Sheets-Sheet 1
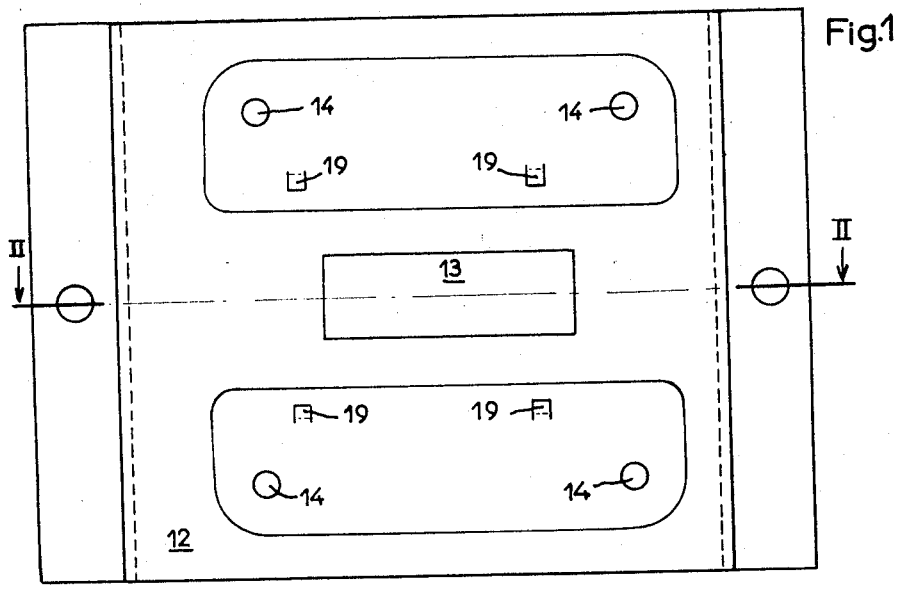
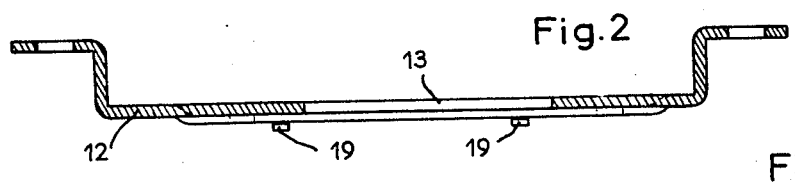
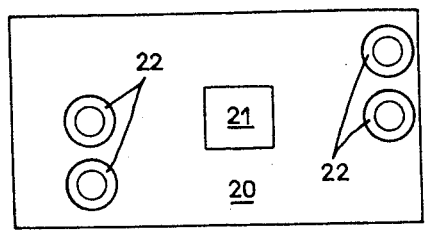
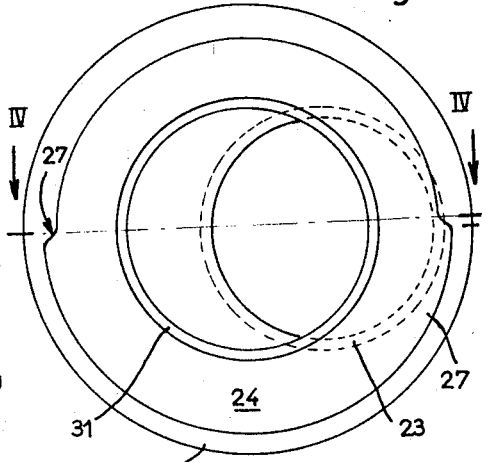
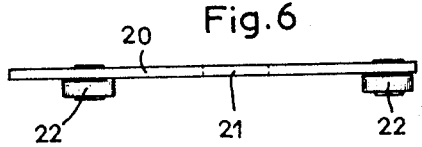
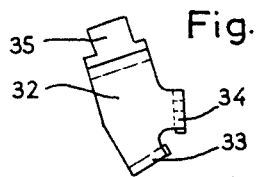
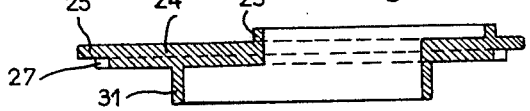

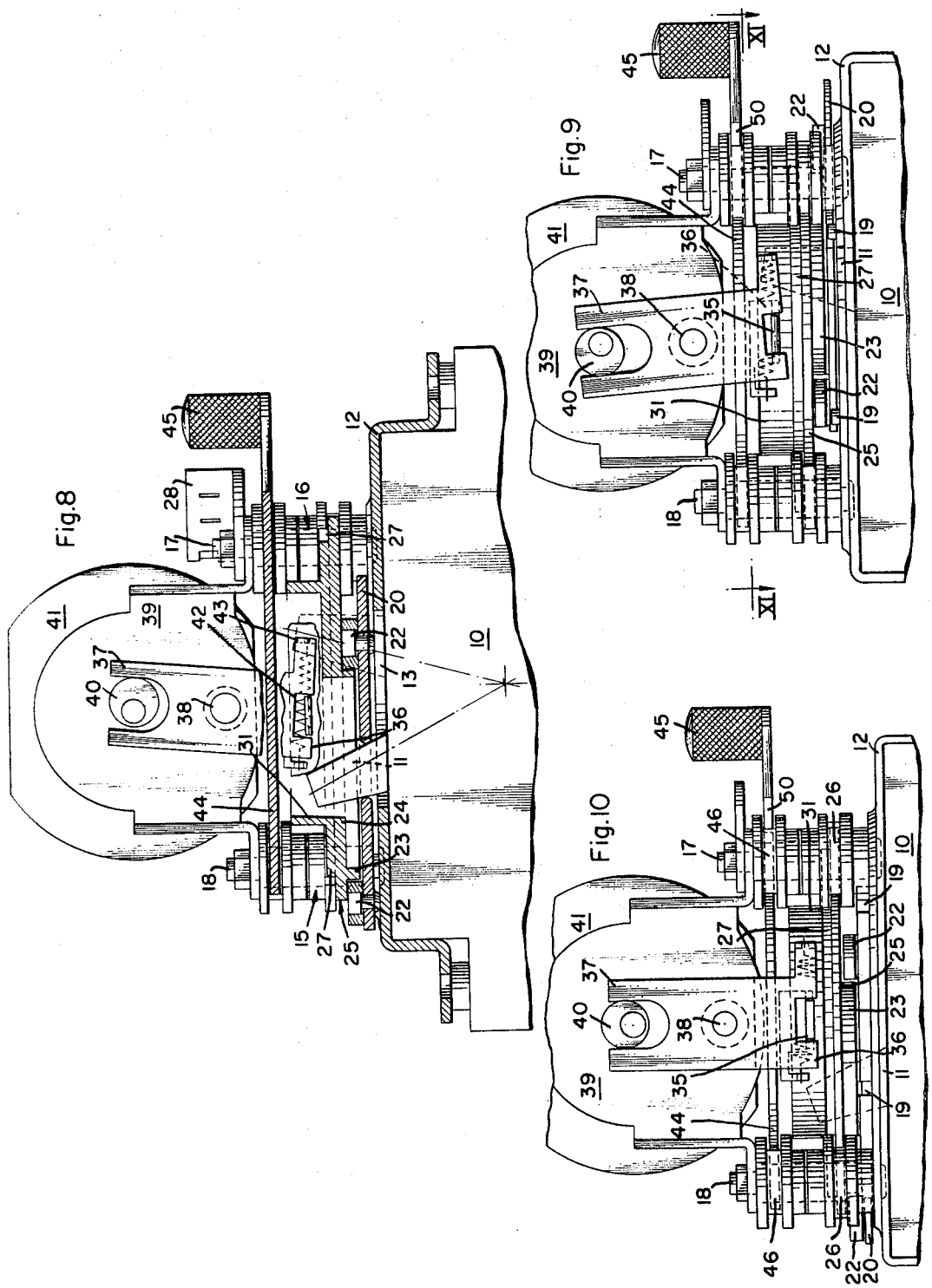

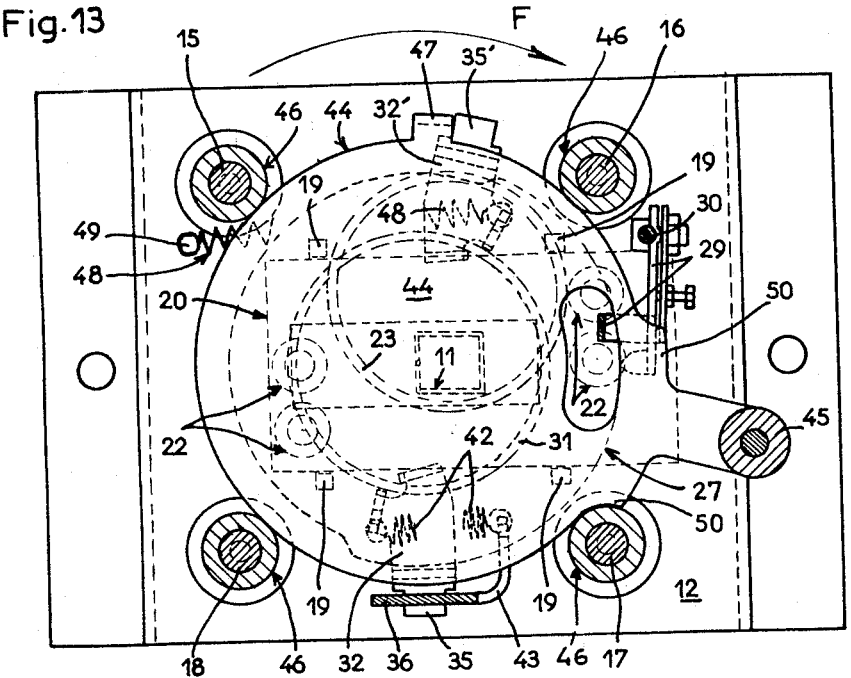
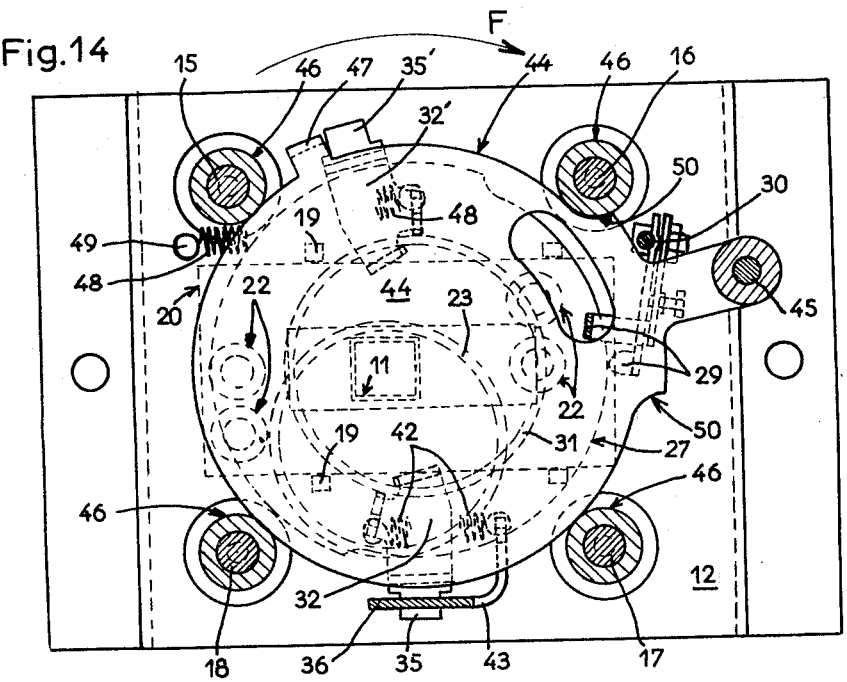

United States Patent Office 3,395,371
Patented July 30, 1968

3,395,371
MOTOR OPERATED CONTROL DEVICE FOR ELECTRIC SWITCHES COMPRISING A ROCKING CONTROL
Gérard Terrier, Grenoble, France, assignor to Etablissements Merlin & Gerin, Société Anonyme, Grenoble, France
Filed Nov. 22, 1966, Ser. No. 596,334
Claims priority, application France, Dec. 2, 1965, 40,741
2 Claims. (Cl. 335—74)

ABSTRACT OF THE DISCLOSURE

A motor and manually operable control device for electric switches with a rocking control lever, said device having a sliding member engaging said lever and adapted to rock same in response to the rotation of a rotary member operatively connected with said sliding member. A step-by-step driving device is provided which is driven by a motor and which is operatively connected with said rotary member to cause a unidirectional step-by-step rotation thereof, along with a manually controlled step-by-step driving device also operatively connected with said rotary member to cause a unidirectional step-by-step rotation thereof, the driving member of one of the driving devices constituting the retaining member of the other driving device, and the driving member of the other step-by-step driving device constituting the retaining member of the first step-by-step driving device.

---

The present invention relates to a motor operated control device for electric switches and particularly for enclosed switches having a manually operable handle projecting through an aperture in one of the walls thereof.

The object of the invention is to provide a motor and manually operable circuit breaker assembly, basically motor operated, but readily capable of manual operation at all times.

Another object of the invention is an electric drive device which comprises a minimum of parts which can be readily manufactured, and in particular parts produced by stamping, which can be enclosed within a housing requiring only a minimum amount of space.

Circuit breaker assemblies of the type referred to are already known. But the present invention affords, relatively to the prior art, the following improvements:

The motor operated control and the manually operated control are not mutually exclusive. The circuit breaker is at all times capable of manual operation, without any change in the internal or external arrangement.

Furthermore, the motor itself is not necessarily a reversible rotary motor, but may be an unidirectional rotary motor or a non rotary motor, for example an electric magnet—and braking devices are not necessary to stop the movement of the motor.

It is already known to control the control handle of switches of the aforesaid type by means of a slide.

According to the invention the movement of the slide is controlled by a rotary member, and two step-by-step control devices are provided to cause selectively an unidirectional rotation of said rotary member, one of said step-by-step control devices being manually controlled, the other one being motor controlled.

Step-by-step control devices are well-known in the art to promote a discontinuous movement, and, generally, a periodic movement, the steps having the same amplitude. Such devices may be actuated by rotary unidirectional rotating motors or by reciprocating motors, such as electro-magnets.

Generally, such step-by-step control devices include a driving member and a retaining member, and step-by-step control devices of this type are known in which the driving member and the retaining member have such a structure that each may be utilized differently as driving or as retaining member.

The preferred embodiment of the present invention includes two step-by-step control devices of the aforesaid type, each including a driving member which constitutes the retaining member of the other.

The invention will be better understood with reference to the description given below of a preferred embodiment of the invention shown in the accompanying drawings, given by way of illustration and not of limitation, in which drawing:

FIGURE 1 is a plan view in elevation of the supporting plate or base of the drive device in accordance with the invention;

FIGURE 2 is a section through the plate or base along the line II—II of FIGURE 1;

FIGURE 3 is a top view of the rotating member;

FIGURE 4 is a section along the line IV—IV of FIGURE 3;

FIGURE 5 is a top view of the slide;

FIGURE 6 is a side view of the slide;

FIGURE 7 is a top view of a rider;

FIGURE 8 is a side view, partially in section, of a control device according to the invention mounted on the housing of a switch;

FIGURE 9 and 10 are side views of a detail of said device in two different positions;

FIGURES 13 and 14 show the device in two different positions seen in cross sections located directly below the motor and above the manually driven disc.

Figure 11:
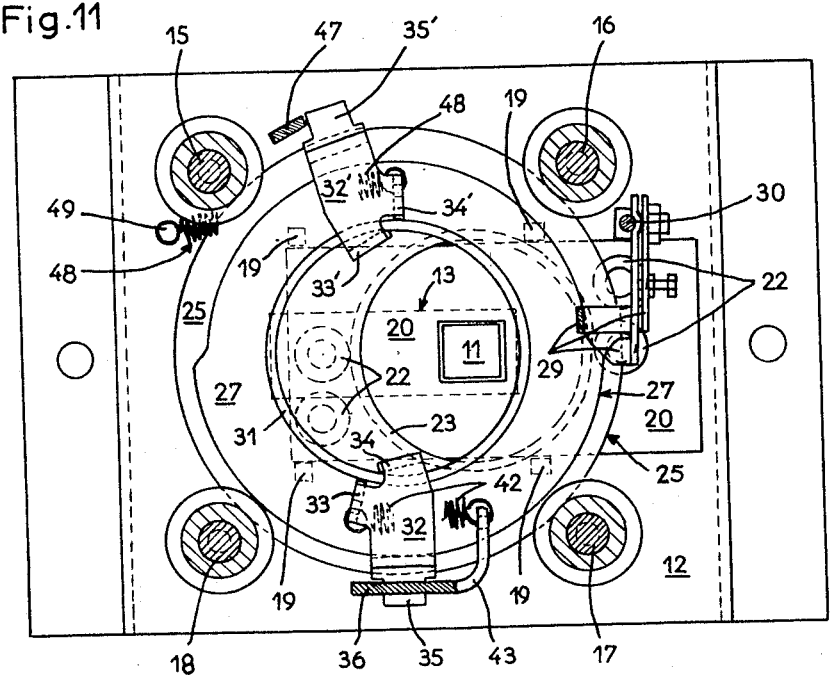
FIGURE 11 is a plan view, partially in section, along the line XI—XI of FIGURE 9.
Figure 12:
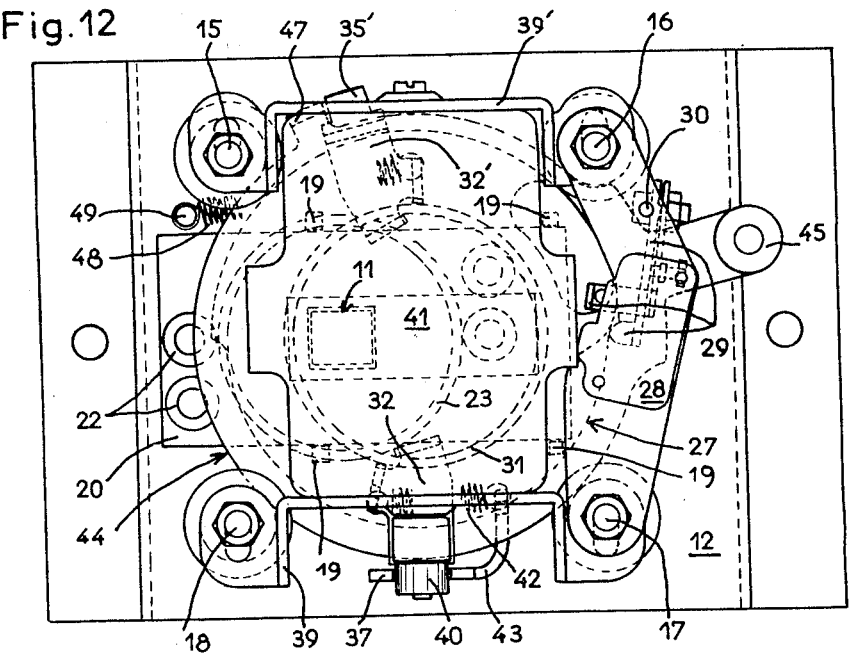
FIGURE 12 is a plan view of the device, the electric motor being shown only in contour.

In the figures the control device is fastened on the housing 10 of a switch, including a rocking control handle or lever 11, by means of a plate or base 12. This base has a hole 13 (see FIGURE 8) which is adapted to be traversed by the handle 11. Four holes 14 (FIGURE 1) serve to receive four small posts 15 to 18 bearing the different parts of the control device. Four spurs 19 (FIG. 1) make it possible to guide a slide 20 (FIGURES 5 and 6), a hole 21 in the slide being traversed by the handle. Four rollers 22 are borne by the silde so as to be able to engage the periphery of a cylindrical flange 23 (FIGURES 3 and 4) borne by a rotary member 24. The latter comprises a disc 25 guided in the bearings 46 (FIG. 10) of the four posts 15 to 18. A cam 27 is rigidly connected with the member 24 and intended to control the electric contact (not shown) of a reversing switch 28 (FIGURES 8 and 12) by means of a lever 29 turning around a fixed pin 30. A cylindrical cam surface 31 is also rigidly connected with the member 24 and coaxial with the disc 25. A rider 32 comprising two lugs 33 and 34, bent at a right angle, and a tail 35, straddle the cylindrical cam 31 so as to wedge the latter when exerting a torque on it. The tail 35 penetrates between the fork 36 of the exetremity of a rocking lever, which lever can pivot around a fixed pin 38 which is borne by a hanger 39 screwed onto the small posts 17 and 18. The fork 37 at the other extremity of said lever is imparted a reciprocating motion by an eccentric 40 rigidly connected with the shaft of an electric motor 41. A tension spring 42 urges the lug 34 and the rider 32 in a direction opposite that indicated by the arrow F in FIGURES 13 and 14, the opposite end of the spring being hooked on a lug 43 of the fork 36. A disc 44 comprising an operating handle 45 is also coaxial with the disc 25 and borne by bearings 46 of the posts 15 to 18. The disc 44 comprises a lug 47 bent at a right angle, against which there rests the tail 35' of a second rider 32' identical to the rider 32 and also engaging the cam 31. The lug 34' of the rider 32' is brought into a direction opposite the direction indicated by the arrow F, by a tension spring 48, the opposite end of which is hooked to a fixed pin 49. The rotation of the disc 44 is liimted in both directions by the protruding portion 50 which can strike against the bearings 46 of the posts 16 and 17.

The device operates as follows:

In order to actuate the control device electrically, the motor 41 is caused to turn. The eccentric 40 then imparts by means of the rocking lever, 36, 37 a reciprocating movement to the tail 35 of the rider 32. The rider 32 periodically wedges against the cam 31 and drives the latter step-by-step in the direction indicated by the arrow F. During the return movement of the tail 35 and of the rider 32, the rider 32' the tail 35' of which is resting against the lug 47 which is stationary while the motor rotates, wedges the cam 31 tight and prevents it from returning rearward. When the cam 31 rotates, the eccentric shoulder 23 turns between the rollers 22 and alternately causes the translation of the slide 20 between the spurs 19. This results in a reciprocating movement of the handle 11 which is carried along by the edges of the opening 21 of the slide 20. The cam 27, after each swing of the handle 11, actuates the reversing switch 28 by means of the lever device 29 (a lug of which passes through an opening provided in the disc 44). In this way the reversing switch 28 can reverse the connections of two circuits including each one of the two push buttons (not shown) controling the motor 41.

When it is desired to actuate the drive by hand, the handle 45 is imparted a reciprocating movement such that the lug 47 of the disc 44 periodically actuates the tail 35' of the rider 32'. The latter then drives the cam 31 and the rotary member 24 step by step. The rider 32 serves in this case as retention rider, preventing the rearward movement of the member 24.

It is obvious that various modifications can be made in the device described without thereby going beyond the scope of the invention. For example the transmission between the motor 41 and the rider 32 may be effected differently.

I claim:

1. A motor and manually operable control device for electric switches having a rocking control lever, said device for comprising a sliding member engaging said lever, a rotary member operatively connected with said sliding member to cause the sliding and reciprocating movement thereof and corresponding rocking movement of said lever, a first step-by-step unidirectional driving device operatively connected with said rotary member to cause a unidirectional step-by-step rotation thereof, motor controlled means to drive said first driving device, a second step-by-step unidirectional driving device operatively connected with said rotary member to cause a unidirectional step-by-step rotation thereof in the same direction as caused by said first driving device, and manually controlled means to drive said second driving device.

2. A device as set forth in claim 1, wherein each driving device is in the form of a clutch including a rider, said rotary member having a surface of revolution straddled by the two riders, one of said riders adapted to prevent any rearward movement of the rotary member while the other rider imparts said unidirectional step-by-step rotation to said rotary member.

References Cited

UNITED STATES PATENTS 3,213,235 10/1965 Soos _____ 335—74
3,213,236 10/1965 Pendy _____ 335—74

BERNARD A. GILHEANY, *Primary Examiner.*

H. BROOME, *Assistant Examiner.*